2,874,098
PROCESS OF OXIDIZING AND SEPARATING ALKYLARYL MIXTURES

Herbert R. Appell, North Riverside, Ill., assignor to Universal Oil Products Company, Des Plaines, Ill., a corporation of Delaware No Drawing. Application March 6, 1953
Serial No. 340,931
6 Claims. (Cl. 202—57)

This invention relates to a process for oxidizing and separating mixtures of alkylaromatic compounds and in particular relates to a process for separating a mixture of ethylbenzene and mixed xylene isomers by forming and separating valuable oxygen derivatives of these compounds.

Although alkylaromatic compounds, especially those having lower molecular weights, are considered extremely valuable, they are seldom used per se. The primary importance of alkylaromatic compounds such as toluene, ethylbenzene, or the xylene isomers is as a starting material for organic synthesis reactions. Although light alkylaromatic compounds are rather abundant, they are difficult to obtain in the pure state since they naturally occur mixed with other materials and/or with their isomers. The xylene isomers and ethylbenzene, for example, generally occur as a mixture in a petroleum fraction or in a distillate from coking ovens, etc. Aromatic compounds are difficult to separate from the non-aromatic compounds in the mixture because the boiling points of the organic compounds of a continuous mixture, such as a petroleum fraction, are extremely close and because of the tendency of the cyclic hydrocarbons present to form azeotropic mixtures which cannot be separated by distillation. As a specific example, a petroleum fraction containing the aromatic hydrocarbons having 8 carbon atoms as well as non-aromatic hydrocarbons boiling in the same range may be separated into an aromatic hydrocarbon fraction and a non-aromatic hydrocarbon fraction by extraction with a suitable solvent. The aromatic hydrocarbon fraction resulting from the extraction will contain, essentially, ethylbenzene and ortho, meta, and para xylene. Table I lists the boiling points of these compounds:

Table I

| Compound | B. P., °C. | $\Delta T$ |
|---|---|---|
| Ethylbenzene | 136.2 | |
| | | 2.3 |
| p-Xylene | 138.5 | |
| | | 0.8 |
| m-Xylene | 139.3 | |
| | | 4.7 |
| o-Xylene | 144.0 | |

From an examination of Table I it may be seen that a separation of these aromatic hydrocarbons into pure compound cuts would be very difficult, if not impossible, by ordinary methods. It is an object of this invention to provide a method of separating aromatic compounds by causing them to react to form useful products that may be easily separated.

It is an embodiment of this invention to separate alkylaromatic compounds and, in the same process, prepare useful derivatives thereof by oxidizing the alkylaromatic compounds to form their oxygen-containing derivatives which can be more readily separated.

In a more specific embodiment the present invention relates to a method of separating ethylbenzene, p-xylene, m-xylene and o-xylene from a mixture thereof by oxidizing the various xylenes, to form their corresponding toluic acids, and ethylbenzene, to form acetophenone, and thereafter separating the oxygen derivatives of the original alkylaromatic compounds.

In another embodiment the present invention relates to a method of obtaining ortho xylene from a mixture of ethylbenzene and its xylene isomers which comprises contacting the mixture with an oxygen-containing gas at a temperature below the critical temperature of the mixture, thereby forming acetophenone, p-toluic acid, and m-toluic acid and distilling the resultant mixture to recover an ortho xylene distillate.

In still another embodiment, the present invention relates to the process of oxidizing alkylaromatic mixtures with an oxygen-containing gas in an oxidation reaction promoted with a catalyst.

It is desirable to carry out the oxidation reactions of this invention in the liquid phase since the preferred catalyst of this invention dissolves in the reactants. It is therefore necessary for the reactions to be effected at a temperature below the critical temperature of the aromatic mixture and in a preferred embodiment below about 150° C.

It is well known that an alkylaromatic compound may be treated with oxygen-containing gas with or without a catalyst to form various oxygen derivatives of the original alkylaromatic compound. These reactions have been carried out to form oxygen derivatives containing varying amounts of oxygen as for example, the oxidation of an alkylaromatic may be limited so as to cause the formation of ketones or aldehydes, or may be extended to form acids or even dibasic acids from xylenes. It has been observed that a mixture of alkylaromatic compounds may be selectively oxidized, that is, oxidized at conditions that cause the various compounds in the mixture to oxidize at different rates as well as to form different products. On the basis of these observations, the present invention is directed to a process for the separation of a mixture of alkylaromatic compounds by forming the oxygen derivatives of a limited number of them, and subsequently separating the resultant oxygen derivatives from the remaining alkylaromatic compounds by distillation. The latter distillation may be easily accomplished since the oxygen derivatives boil at substantially higher temperatures and with greater temperature differentials between the oxidized components than the original alkylaryl compounds.

When it is desired, for example, to separate a mixture of the xylene isomers and ethylbenzene, the mixture may be treated with oxygen under controlled conditions with or without a catalyst present, to form oxygen derivatives of at least some of the compounds. A comparison of the relative ease of oxidizing the components of such a mixture indicates that the rate of oxidation decreases in the following order: ethylbenzene, p-xylene, m-xylene, and o-xylene. At conditions that will oxidize ethylbenzene, p-xylene and m-xylene at a rate of from about 5% to 10% per hour, o-xylene is substantially inert to the action of oxygen. The reaction conditions may be controlled to produce a mixture containing acetophenone, p-toluic acid, m-toluic acid, and o-xylene. The boiling points of these compounds are shown in Table II below.

Table II

| Compound | B. P., °F. | $\Delta T$ |
|---|---|---|
| o-Xylene | 144 | |
| | | 58.3 |
| Acetophenone | 202.3 | |
| | | 60.7 |
| m-Toluic acid | 263 | |
| | | 11.0 |
| p-Toluic acid | 274 | |

Comparing the data of Table II with those of Table I it may be seen that the compounds of Table I have boiling point differences of 2.3° F., 0.8° F., and 4.7° F. in ascending order, which, as hereinbefore stated, are so small as to make separation by distillation virtually impossible. It may be seen from Table II that the differences in boiling points of the materials now to be separated are 58.3° F., 60.7° F. and 11° F. A distillation of this mixture may be readily effected since the boiling points of the various components are substantially different. This method may be used to produce o-xylene and the oxygen derivatives of the other components of the aromatic mixture, or, the o-xylene recovered may be treated with oxygen at more severe conditions to form o-toluic acid.

It may readily be seen that the method of this invention may be used to separate mixtures of some of these compounds as well as mixtures of all of them. This method may be used as one step in a series of steps, for example, to remove trace quantities of ethylbenzene from o-xylene to prepare a charge stock for a process requiring pure o-xylene.

The final separation of the oxidized isomers may be effected by means other than distillation. For example, the freezing points of the oxygen derivatives are substantially changed from that of the original alkylaromatic compounds as is the solubility in various solvents. These changes facilitate separations by fractional crystallization or by extraction. Other separation means may also be used.

Suitable catalysts for the present process which promote the oxidation include compounds of the group VIII metals, preferably those which are hydrocarbon soluble or form hydrocarbon soluble compounds during the oxidation; other promoters include compounds derived from the groups IB, IIB, V, VI and the rare earths, oxides, sulfides or salts and their mixtures. The catalyst may be used by itself or composited with a suitable carrier such as kieselguhr, pumice, clay, diatomaceous earth, bauxite, or synthetically prepared silica, alumina, zirconia, zinc oxide, etc. or mixtures thereof such as silica-alumina, silica-zirconia, silica-alumina-zirconia, etc. Cobalt and cobalt compounds have been found to be especially suitable catalysts and, in particular, cobalt stearate, which dissolves in aromatic compounds, has been found effective.

Following is an example of one embodiment of this invention presented to better illustrate the invention, but not with the intention of unduly limiting the invention to the particular method or materials described.

70 grams of a mixture of ethylbenzene, o-xylene, p-xylene, and m-xylene containing 99+% of the above alkylaromatics was placed in a Pyrex flask with 0.1 gram of cobalt stearate. This mixture was heated to 135° C. and air was passed through it, through a dip-leg, at a rate of 5 liters per hour. At these conditions it was found that ethylbenzene was oxidized to acetophenone at a rate of from 10% to 12% per hour, p-xylene was oxidized to p-toluic acid at a rate of from 8% to 10% per hour, m-xylene was oxidized to m-toluic acid at a rate of from 6% to 8% per hour and o-xylene was substantially not oxidized. After the reaction proceeded for sufficient time to cause the oxidation of ethylbenzene, p-xylene and m-xylene to be substantially complete, it was stopped and the reactants were cooled to room temperature. The contents of the flask are thereafter charged to the reboiler of a glass fractionation column having a packed section 15 inches long, containing 1/8 inch glass beads, and provided with a thermometer above the packed section, an overhead condenser, a product receiver and means for refluxing. The distillation is effected by charging the entire reaction product to the reboiler of the column, applying heat to the reboiler and taking cuts of overhead product consistent with temperature changes indicated on the thermometer. The column is started by refluxing all of the overhead for 15 minutes after which time part of the overhead is taken as product until a sharp temperature rise is noticed on the thermometer. At this time the product receiver is changed and the next cut is collected until a second sharp temperature rise is noticed. A third cut is taken in a similar manner after which the fractionation is stopped and the material remaining in the reboiler is considered to be the fourth cut. During the entire operation the reflux ratio is roughly 1:1 and heat is applied to the reboiler to keep the boiling brisk, but not violent. An examination of the cuts show the first cut to be o-xylene of 98% purity, the second cut to be substantially acetophenone, and the third and fourth cuts to be rich in meta and para toluic acids respectively. A better fractionation may be used to separate the toluic acids from each other and from other products, or other means may be used such as extraction, water washing, etc.

Although this method has been explained specifically for $C_8$ aromatic compounds, it is applicable to others, both heavier and lighter, such as toluene, diethylbenzene, etc. The oxidation reactions may be effected at any suitable temperature from room temperature to the critical temperature, or higher. The temperature for the reaction should be selected so that the desired reaction will proceed at a reasonable rate with a minimum of side reactions. For example, the oxidation of mixed $C_8$ alkylaromatic hydrocarbons should not be effected at temperatures in excess of 150° F. since acetophenone is unstable at higher temperatures. When, however, it is desired to produce phthalic acids, higher temperatures are desired because the oxidation of xylene is effected at a faster rate and the decomposition of acetophenone to lighter compounds facilitates its removal from the product.

I claim as my invention:

1. A process for the recovery of o-xylene from a mixture thereof with ethylbenzene and m- and p-xylenes, which comprises contacting said mixture with a free oxygen-containing gas at controlled oxidation conditions such that the ethylbenzene and m- and p-xylene are oxidized to acetophenone, m-toluic acid and p-toluic acid, respectively, at a rate of from about 5% to 10% per hour, whereby the o-xylene is substantially inert to the action of the oxygen-containing gas, discontinuing the reaction before any appreciable oxidation of the o-xylene has occurred, and fractionally distilling the resultant reaction mixture to separate the unreacted o-xylene from the oxidation products of the ethylbenzene and m- and p-xylenes.

2. The process of claim 1 further characterized in that said mixture is contacted with said gas at an oxidation temperature not in excess of 150° C.

3. The process of claim 1 further characterized in that said mixture is contacted with said free oxygen-containing gas in the presence of a catalyst.

4. The process of claim 1 further characterized in that said mixture is contacted with said free oxygen-containing gas in the presence of a catalyst comprising a compound of a metal of group VIII of the periodic table.

5. The process of claim 1 further characterized in that said mixture is contacted with said free oxygen-containing gas in the presence of a cobalt-containing catalyst.

6. The process of claim 1 further characterized in that said mixture is contacted with said free oxygen-containing gas in the presence of a catalyst comprising cobalt stearate.

References Cited in the file of this patent

UNITED STATES PATENTS

| | | |
|---|---|---|
| 2,255,421 | Groll et al. | Sept. 9, 1941 |
| 2,640,804 | Whitney | June 2, 1953 |
| 2,644,840 | Roebuck | July 7, 1953 |
| 2,653,165 | Levine | Sept. 22, 1953 |
| 2,785,199 | Himel | Mar. 12, 1957 |

FOREIGN PATENTS

| | | |
|---|---|---|
| 666,709 | Great Britain | Feb. 20, 1952 |